United States Patent [19]

Aoki

[11] Patent Number: 4,712,185
[45] Date of Patent: Dec. 8, 1987

[54] DOT INTERPOLATION CONTROL SYSTEM

[75] Inventor: Hiroyuki Aoki, Hanno, Japan

[73] Assignee: Kabushiki Kaisha Toshiba, Kawasaki, Japan

[21] Appl. No.: 727,910

[22] Filed: Apr. 26, 1985

[30] Foreign Application Priority Data

| Apr. 28, 1984 | [JP] | Japan | 59-86371 |
|---|---|---|---|
| Apr. 28, 1984 | [JP] | Japan | 59-86372 |
| Apr. 28, 1984 | [JP] | Japan | 59-86373 |
| Apr. 28, 1984 | [JP] | Japan | 59-86375 |
| Apr. 28, 1984 | [JP] | Japan | 59-86376 |

[51] Int. Cl.[4] .................. G06F 15/626; G06K 9/42
[52] U.S. Cl. ................................... 364/518; 364/519; 364/521; 382/46; 382/47
[58] Field of Search .................. 382/41, 45–47; 364/518–521

[56] References Cited

U.S. PATENT DOCUMENTS

| 4,155,072 | 5/1979 | Kawa | 382/46 |
|---|---|---|---|
| 4,379,283 | 4/1983 | Ito et al. | 382/41 |
| 4,434,503 | 2/1984 | Tanaka et al. | 364/518 |
| 4,475,162 | 10/1984 | Kitamura | 364/518 |
| 4,490,789 | 12/1984 | Leban et al. | 364/518 |
| 4,573,199 | 2/1986 | Chen et al. | 382/47 |

OTHER PUBLICATIONS

Information Processing Institute 26-th National Meeting, pp. 1411-1412, System for Translating the Configuration of Multi-Gradation Character Fonts the Hitachi General Research Institute Yajima Primary Examiner—Errol A. Krass
Assistant Examiner—Brian M. Mattson
Attorney, Agent, or Firm—Cushman, Darby & Cushman

[57] ABSTRACT

According to a dot interpolation control system for dot-interpolating a character pattern in a predetermined dot matrix form along at least the main scanning direction or the subscanning direction, there is provided a pair of registers for designating initial addresses of interpolated dots along the main scanning direction, another pair of registers for designating a dot pitch along the main scanning direction, and still another pair of registers for designating a dot pitch along the subscanning direction. Data pairs of x and y components, which selectively include trigonometric function data representing a designated rotation or inclination angle, are set in the corresponding registers. Dot interpolation of a character pattern is performed by main scanning and subscanning in accordance with the contents of the respective registers, thereby obtaining a rotated or inclined character on the basis of the designated angle.

14 Claims, 25 Drawing Figures

F I G. 2A
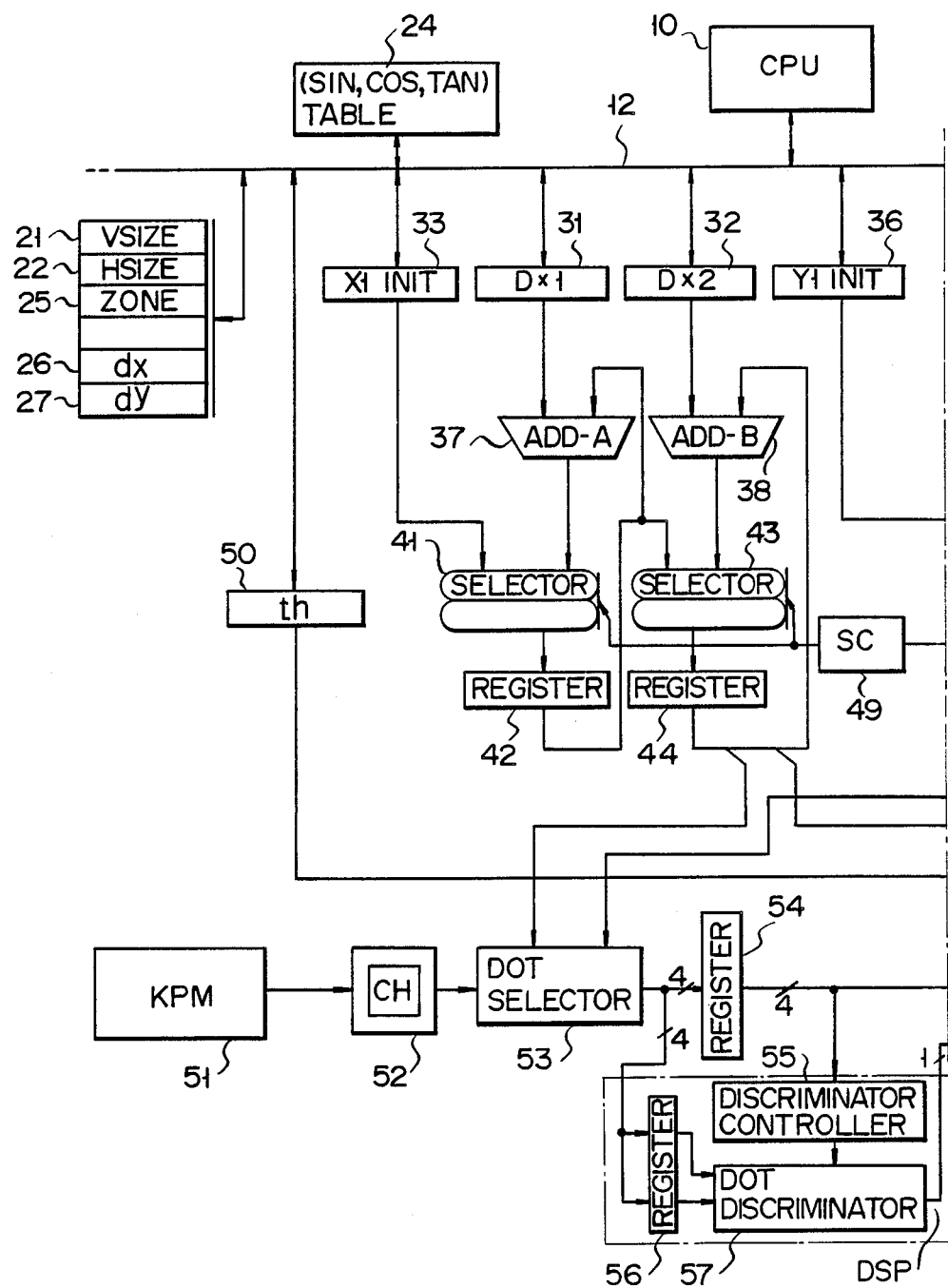

F I G. 7
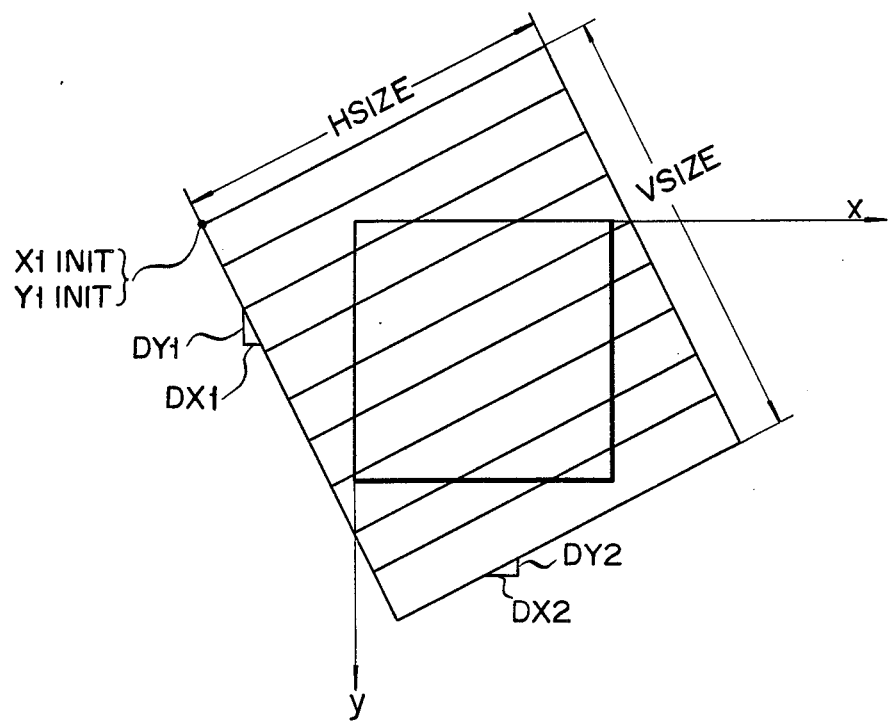
F I G. 8
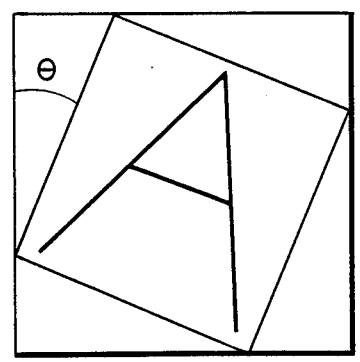

FIG. 9
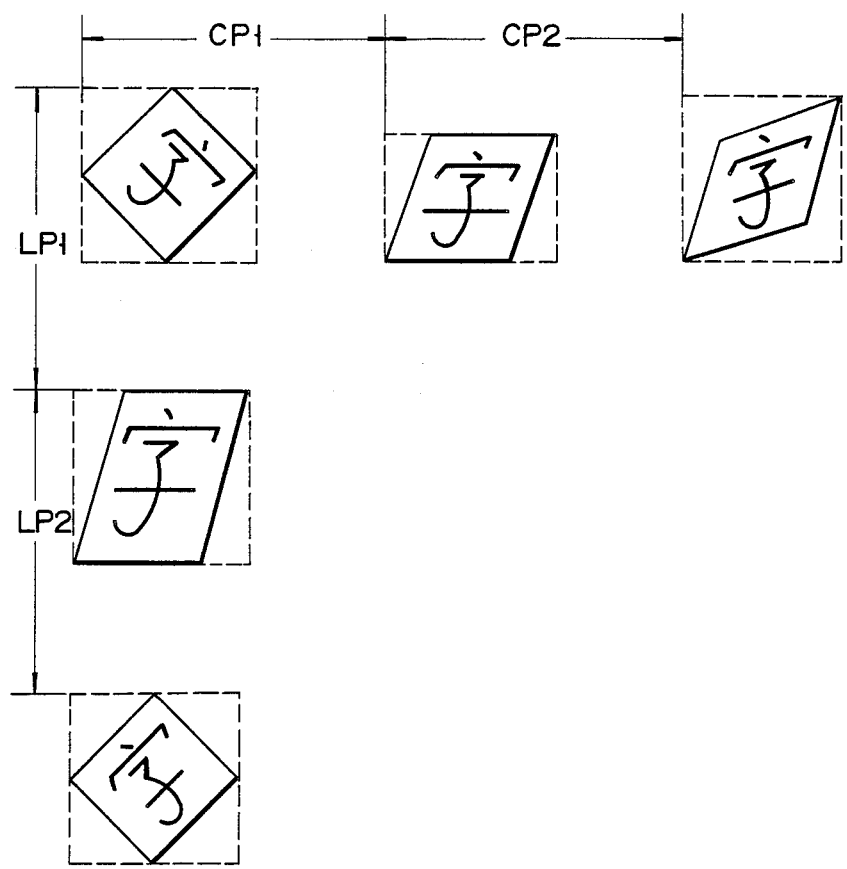
FIG. 10A   FIG. 10B   FIG. 10C
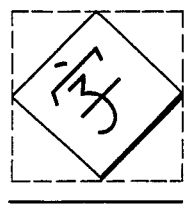 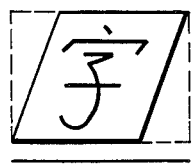 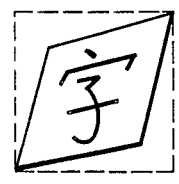

F I G. 11
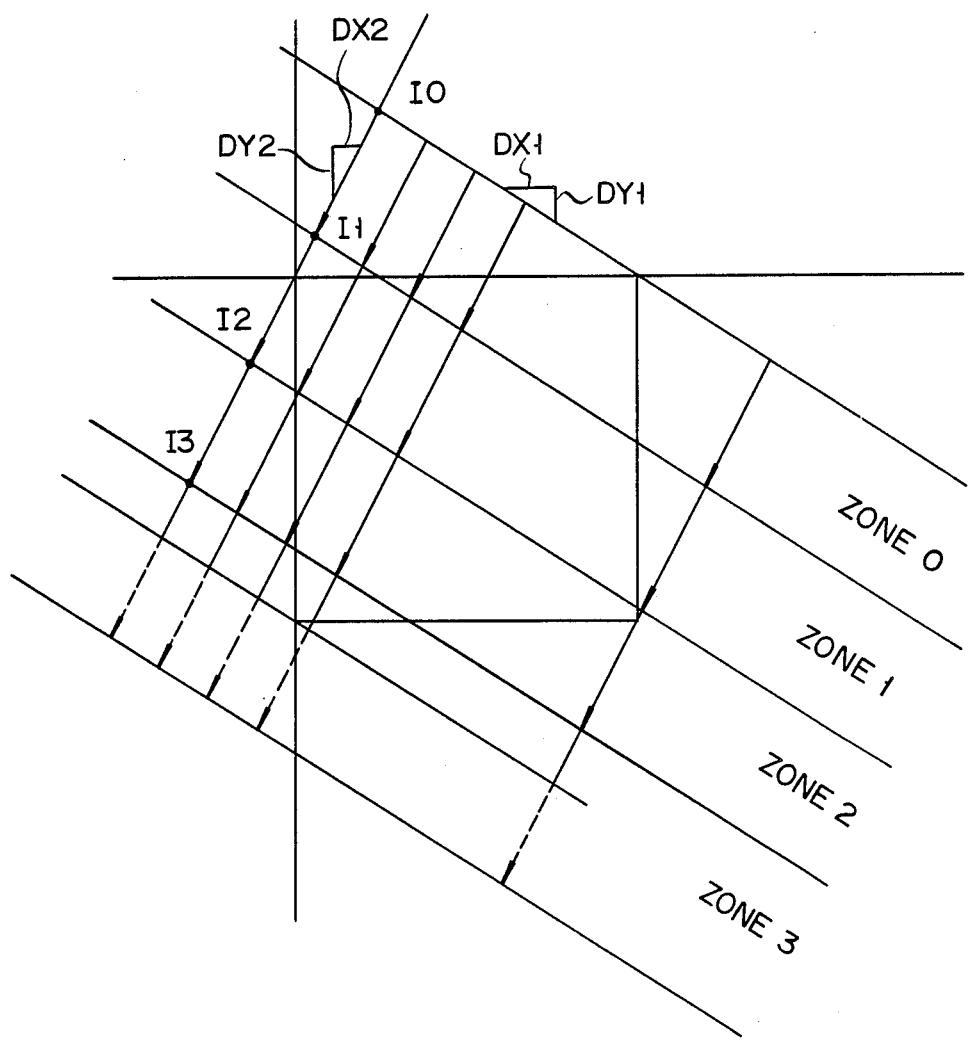

DOT INTERPOLATION CONTROL SYSTEM

BACKGROUND OF THE INVENTION

The present invention relates to an output control system for an interpolation dot pattern used in a word processor or a character generator which processes character font data in a dot matrix form.

In order to expand or contract a character or letter font of a defined dot matrix form in an apparatus such as a word processor for processing the character font, the number of original character pattern dots SD are simply increased or decreased, as shown in FIGS. 1A through 1C in accordance with a conventional simple expansion/condensation method.

A conventional expansion/condensation means of this type can be easily implemented at low cost. However, steps (i.e., narrowed portions) maybe visible at an inclined portion of a character when using this technique. Therefore, an output pattern may be different from the original character pattern and difficult to recognize, resulting in an unnatural character presentation and hence inconvenience.

The conventional dot interpolating means described above cannot easily create a modified type face such that an original character pattern or a character pattern with any magnification/condensation coefficient is inclined or rotated. In addition, even if the modification range is greatly limited, a distortion occurs in the modified character pattern. Conversion precision is greatly degraded and pattern conversion cannot be accurately performed.

The width or height or both of a modified character such as a rotated character or an inclined character is not expressed in a dot form in units of bytes. A scanning start position of a new character pattern created by dot interpolation does not match with a byte boundary of an image memory for writing image data in units of bytes when the new character pattern data is transferred from the dot interpolating means to the image memory. The image data cannot, therefore, be processed in further units of characters, resulting in inconvenience. According to a conventional dot interpolation technique, since the dot-interpolated character image is expanded with respect to a fixed position corresponding to scanning, an agate or a contracted character (having a width half of that of an em) cannot be vertically shifted by a few dots, resulting in inconvenience.

The width or height or both of a modified character such as a rotated or inclined character obtained by dot interpolation varies in accordance with a designated magnification or condensation coefficient and a rotation angle. In the worst case, a converted one-character dot image representing an expanded, rotated or inclined character cannot be stored in a one-line image area (e.g., an image line buffer). When a conventional character generating means is used, part of the character is omitted, and a single character is separated into portions printed on two different lines. Due to a functional problem, the conventional interpolating means cannot produce an image having a slice which is formed by multiple printing.

A width of the modified character such as a rotated or inclined character along the main scanning direction varies in accordance with a rotation angle and a magnification/contraction coefficient. For this reason, an underline or a side line corresponding to the character width must be drawn for each modified character.

A character pitch or a line pitch cannot be optimally kept in the modified character due to the problem described above.

SUMMARY OF THE INVENTION

It is an object of the present invention to provide a dot interpolation control system wherein expansion or contraction of any character with any magnification or contraction coefficient can be performed with high quality by using a relatively simple arrangement, any character can be accurately rotated and inclined without distortion, and pattern conversion such as rotation or inclination of an expanded/contracted character can be performed with high precision at high speed.

It is another object of the present invention to provide an interpolated dot pattern output control system wherein correspondence between a write start position of character pattern dots obtained by dot interpolation and a memory boundary of an image memory can be always established to simplify image data processing in units of modified characters when an original character font is modified by dot interpolation with high precision in accordance with any magnification or contraction coefficient and an inclination angle, and the modified character can be shifted within a range of a write width of the image memory.

It is still another object of the present invention to provide a dot interpolation control system wherein a character pattern to be expanded in the image memory can be dot-expanded as a single character pattern even if the character pattern exceeds a defined line width, and any portion of the image can be continuously dot-expanded a desired number of times, when an original character font is modified by dot interpolation in accordance with any magnification/contraction coefficient and any inclined angle.

It is still another object of the present invention to provide an under/side line generator in a pattern conversion mechanism for dot-interpolating a character pattern having a predetermined dot matrix form expressed by x- and y-coordinates at a designated angle along the main scanning or subscanning direction so as to obtain a rotated or inclined modified character pattern, wherein an under/side line pattern can be expanded by an optimal length along a character string direction for each dot-interpolated modified character with a designated inclination angle by using a relatively simple arrangement.

It is still another object of the present invention to provide an under/side line generator in a pattern conversion mechanism for dot-interpolating a character pattern having a predetermined dot matrix form expressed by x- and y-coordinates at a designated angle along the main scanning or subscanning direction so as to obtain a rotated or inclined modified character pattern, wherein the respective dot-interpolated modified characters with a designated inclination angle can be arrayed at proper intervals with a relatively simple arrangement.

According to an aspect of the present invention, there is provided a dot interpolation apparatus for dot-interpolating a character pattern in a predetermined dot matrix form along at least the main scanning or subscanning direction, comprising a pair of registers for designating initial addresses of a dot to be interpolated, a pair of registers for designating a dot pitch along the main scanning direction, and a pair of registers for designating a dot pitch along the subscanning direction, wherein x- and y-component data selectively including trigonometric function data corresponding to a designated rotation angle or an inclination angle are set in the above registers, thereby performing dot interpolation for a rotated or inclined character or letter on the basis of the designated angle in accordance with the main scanning and subscanning which are controlled by the contents of the corresponding registers. By using a relatively simple arrangement, any character can be accurately rotated or inclined at any inclination angle, and high-speed pattern conversion such as expansion, contraction, rotation and inclination can be performed with high precision by dot interpolation.

According to another aspect of the present invention, x and y dot interpolation addresses along the main scanning direction and x and y dot interpolation addresses along the subscanning direction are stored in a shift register having a bit length corresponding to the write width of the image memory in which the dot-interpolated character pattern is expanded. An offset data generating means is provided for selectively generating an offset value within the bit range corresponding to the write width of the image memory before the interpolated dots along the main scanning direction are stored in the shift register, and for writing the dots in the shift register. In this manner, the correspondence between the write start position of the character pattern dots obtained by dot interpolation and the write boundary of the image memory is established. When the original character font is modified by dot interpolation with high precision in accordance with any magnification/contraction coefficient and any inclination angle, the write start position of the character pattern dots obtained by dot interpolation can correspond to the memory boundary of the image memory, thereby simplifying image data processing in units of modified characters. As a result, the modified character can be shifted within the range of the write width thereof, thus reinforcing the output function of the dot-interpolated character pattern.

According to still another aspect of the present invention, there is provided a dot interpolation system for dot-interpolating a character pattern in a predetermined dot matrix form along at least the main scanning or subscanning direction, comprising a means for producing interpolated dots in accordance with the x and y dot interpolation addresses along the main scanning direction and the x and y dot interpolation addresses along the subscanning direction. The dot interpolation system also comprises a zone designating means for dividing the resultant interpolated dot data into zones in accordance with a slice width having a predetermined dot unit and a means for transferring the image data from a zone designated by the zone designating means. The modified character obtained by expansion, rotation or inclination is expanded into zones each having a predetermined unit dot width. As a result, when the original character font is modified by dot interpolation in accordance with any magnification/contraction coefficient and any inclination angle, and even if the width of the character pattern to be expanded in the image memory exceeds the defined line width, the resultant character pattern can be processed and expanded as a single letter. At the same time, a portion of the character image can be continuously dot-expanded a desired number of times.

According to still another aspect of the present invention, there is provided a pattern conversion mechanism for dot-interpolating a character pattern in a predetermined dot matrix form expressed by x- and y-coordinates in accordance with any inclination angle along at least the main scanning or subscanning direction so as to obtain a modified character pattern which is expanded or inclined, wherein a length of at least one side of an area of a rectangle along the x and y lines which circumscribe a pattern converted character is calculated, a number of expanded dots along the x or y direction for the length of the character along the main scanning direction is obtained in accordance with the length data, and an under/side line pattern corresponding to the modified character pattern is expanded in accordance with the dot number data. As a result, the under/side line pattern can be properly expanded to an optimal length with respect to each modified character.

According to still another aspect of the present invention, there is provided a pattern conversion mechanism for dot-interpolating a character pattern in a predetermined dot matrix form expressed by x- and y-coordinates at any designated angle along at least the main scanning or subscanning direction so as to obtain a modified character pattern which is rotated or inclined, wherein an area of a rectangle along the x and y lines which circumscribe a frame of the character pattern-converted at the designated angle is calculated, and the character interval is controlled in units of the rectangular areas. As a result, a character generator can be obtained wherein intervals between modified characters can be optimized, and rotated or inclined letters or characters can be properly arrayed with high precision.

In order to achieve the above objects of the present invention, there is provided a dot interpolation control system for dot-interpolating a character pattern in a predetermined dot matrix form along at least a main scanning or subscanning direction and for converting the character pattern to an inclined or rotated character in accordance with dot position data along the main scanning direction and the subscanning direction, comprising:

first operating means for calculating an initial value and a dot pitch along the main scanning direction in accordance with x and y component data and angle component data;

first memory means for storing the initial value along the main scanning direction calculated by the first operating means;

second memory means for storing the dot pitch along the main scanning direction calculated by the first operating means;

third memory means for storing dot position data along the main scanning direction;

second operating means for loading the data stored in the first memory means in the third memory means, for calculating dot positions along the main scanning direction in accordance with the content of the second and third memory means, and for storing the dot positions in the third memory means;

third operating means for calculating an initial value and a dot pitch along the subscanning direction in accordance with the x and y component data and the angle component data;

fourth memory means for storing the initial value along the subscanning direction calculated by the third operating means;

fifth memory means for storing the dot pitch along the subscanning direction calculated by the third operating means;

sixth memory means for storing dot position data along the subscanning direction; and fourth operating means for loading the data stored in the fourth memory means in the sixth memory means, for calculating dot positions along the subscanning direction in accordance with the contents of the fifth and sixth memory means, and for storing the dot positions in the sixth memory.

BRIEF DESCRIPTION OF THE DRAWINGS

Other objects and features of the present invention will be apparent from the following descriptions when taken in connection with the accompanying drawings, in which:

FIGS. 2A and 2B are respectively block diagrams showing the main part of a dot interpolation control system according to an embodiment of the present invention;

FIG. 7 is a representation showing relationships among various input data;

FIG. 8 is a representation showing a relationship between a character which is pattern-converted by dot interpolation and rectangle circumscribing the pattern-converted character;

FIG. 9 is a representation showing the different character and line pitches of different modified characters;

FIGS. 10A through 10C are representations showing expansion of underlines for different modified characters; and FIG. 11 is a representation for explaining a zone dividing means.

DETAILED DESCRIPTION OF THE PREFERRED EMBODIMENT

Figure 1A:
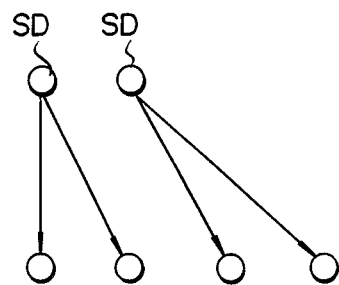
FIGS. 1A through 1C are respectively representations for explaining conventional dot interpolation means.
Figure 1B:
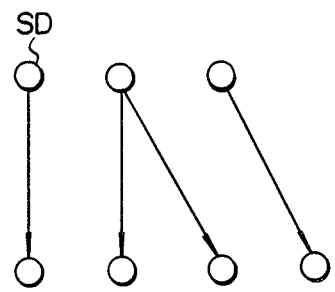
Figure 1C:
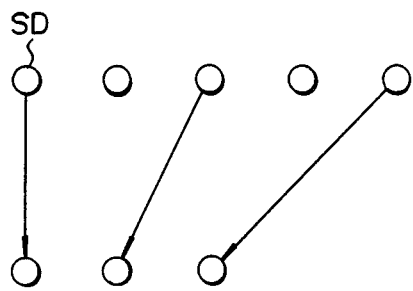
Figure 2B:
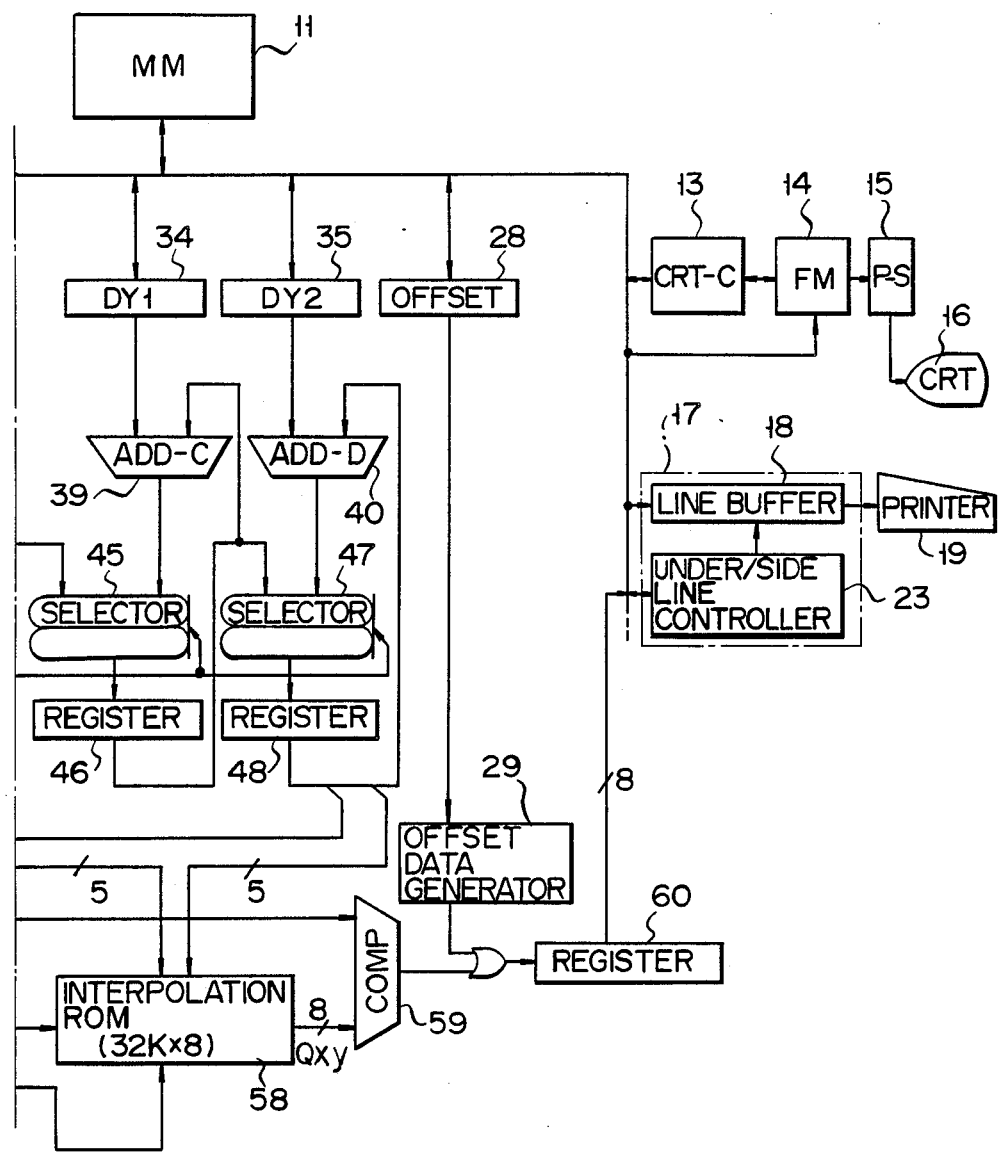

A dot interpolation control system according to an embodiment of the present invention will be described with reference to the accompanying drawings. Referring to FIGS. 2A and 2B, the dot interpolation control system comprises a CPU 10 for controlling the overall operation of the system, a main memory (MM) 11, a display control circuit (CRT-C) 13, a frame memory (FM) 14, a parallel-serial converter 15, a CRT display (CRT) 16, a printer control section 17, a line buffer 18 and a serial dot printer 19.

A value in register 21 represents a size (i.e., a V size) corresponding to a width (i.e., [main scanning pitch]×[number of times]) of the subscanning direction which is obtained after a character pattern is converted. A value in register 22 represents a size (i.e., an H size) corresponding to the width along the main scanning direction. An under/side lines controller 23 generates a dot pattern of the under/side line having a length represented by the content of the register 21. The generated under/side line pattern is written in the buffer 18. A trigonometric function table 24 stores angle data (i.e., trigonometric function data) corresponding to an angle designated when the character is inclined or rotated. A register 25 is used for zone designation wherein a pattern-converted character pattern is divided into zones in units of reference character heights upon pattern conversion of a character. Registers 26 and 27 store a dot pitch (dx,dy) determined by a magnification/contraction coefficient. An offset register 28 is used to selectively give an offset value to the patternconverted character within a range of 0 through 7 dots. An offset data generator 29 generates offset data ("0" for nondisplay) in accordance with the dot number given by the offset value of the register 28. A register 31 stores an x-component of dot pitch (DX1) along the subscanning direction. A register 32 stores an x-component of dot pitch (DX2) along the main scanning direction. A register 33 stores an x-component of initial address (X1init) along the main scanning direction. A register 34 stores a y-component of dot pitch (DY1) along the subscanning direction. A register 35 stores a y-component of dot pitch (DY2) along the main scanning direction. A register 36 stores a y-component of initial address (Y1init) along the subscanning direction. Each of the dot interpolation addresses stored in the registers 31 through 36 comprises integral part data and decimal part data. An adder (ADD-A) 37 adds the content of the register 31 and the content of the register 42 which represents the x-component of the dot position along the subscanning direction. An adder (ADD-B) 38 adds the content of the register 32 and the content of a register 44 which represents the x-component of the dot position along the main scanning direction. An adder (ADD-C) 39 adds the content of the register 34 and the content of the register 46 which represents the y-component of the dot position along the subscanning direction. An adder (ADD-D) 40 adds the content of the register 35 and the content of the register 48 which represents the y-component of the dot position along the main scanning direction.

A data selector 41 selects the content of the register 33 when one-character dot interpolation is started. Every time main scanning is performed, the selector 41 selects the ouptut from the adder 37. The register 42 stores a new x-component of the dot address which is selected by the selector 41 and which comprises the integral and decimal parts. A data selector 43 selects the content of the register 42 when main scanning is started. Every time one-dot interpolation is performed, the selector 43 selects the output from the adder 38. The register 44 stores a new x-component of the dot address which is selected by the selector 43. A data selector 45 selects the content of the register 36 when one-character dot interpolation is started. Every time main scanning is performed, the selector 45 selects the output from the adder 39. The register 46 stores a new y-component of the dot address which is selected by the selector 45 and which comprises the integral and decimal parts. A data selector 47 selects the content of the register 46 when main scanning is performed. Every time one-dot interpolation is performed, the selector 47 selects the output from the adder 40. The register 48 stores a new y-component of the dot address selected by the selector 47. A selection controller (SC) 49 controls the selectors 41, 43, 45 and 47.

A register 50 stores a comparison value, i.e., a threshold value (th) to be compared with an interpolated value to be described later.

A kanji pattern memory (KPM) 51 stores character pattern data including kanji (i.e., Japanese characters) in a predetermined dot matrix (16×16 dots). A one-character buffer 52 comprises a high-speed RAM which stores a one-character dot pattern read out from the memory 51. In this case, the buffer 52 stores a one-character dot pattern, surrounded by a bit pattern of 'off' dots ("0"3). A dot selector 53 selects dot data of a four-dot matrix for surrounding the new dots from the character pattern data of the buffer 52 in accordance with the integral part data stored in the registers 44 and 48. A register 54 stores four-dot data generated from the selector 53. A dot pattern recognition section (DSP) represented by reference numerals 55 through 57 recognizes the dot data pattern generated from the selector 53 and selectively controls an interpolated value of the new dot surrounded by four dots. More specifically, a judgement controller 55 recognizes a four-dot pattern state in accordance with the bit contents of the register 54. When the state is detected to be a specific status (to be described later), the controller 55 controls the selector 53 which sequentially selects two-dot matrix data whose pattern surrounds the specific dot pattern. A register 56 stores dot data of two-dot matrix surrounding the specific four dots. A dot judgment circuit 57 generates a one-bit interpolated value selection signal in accordance with the dot pattern states of the two-dot matrix data read out under the control of the controller 55 and the dot data stored in the register 54. An interpolation table ROM 58 receives the decimal part (i.e., the offset value including a 5-bit×component along the main scanning direction) stored in the register 44, the four-dot data stored in the register 54 and the one-bit interpolated value selection signal generated from the circuit 57 and generates a new dot interpolated value (Qxy) within the area surrounded by the specific four dots. In this embodiment, the ROM 58 comprises a 256-kbit (32 kbits×8 bits) mask ROM. The ROM 58 generates an 8-bit (0 through 255 levels) interpolated value in response to the 15-bit read address.

A comparator 59 compareas the interpolated value generated from the ROM 58 with the ROM 58 with the threshold value stored in the register 50. When the interpolated value exceeds the comparison value, i.e., the threshold value, the comparator 59 generates a signal of "1" level representing an on dot (i.e., a bright dot). A shift register 60 sequentially receives dot data generated from the comparator 59 and generates the dot data onto a CPU bus 12 every time the dot data is stored in units of write bits (8 bits in this embodiment) of the memory in which the character pattern is expanded.

FIGS. 3A through 11 are representations for explaining the operation of the dot interpolation control system having the arrangement described above.

FIGS. 3A through 3F are representations each showing the relationship between the four-dot data (i.e., the dot pattern) of one matrix for surrounding a new dot to be obtained by interpolation, level segments of the interpolated value set in the ROM 58 and the type of table. It should be noted that the interpolated values are represented by 0 through 255 luminance levels (i.e., density levels), and that the segments are represented by contours.

Figure 3C:
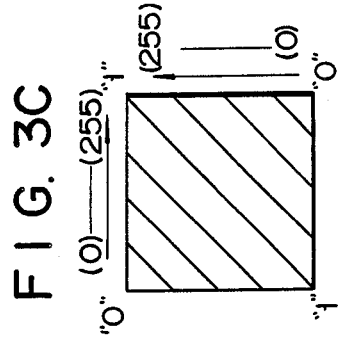
FIGS. 3A through 3F are respectively representations each showing a relationship between a dot pattern in a four-dot matrix surrounding new dots generated by dot interpolation, level segments of the interpolated values set in an interpolation table ROM, and a type of table.
Figure 3F:
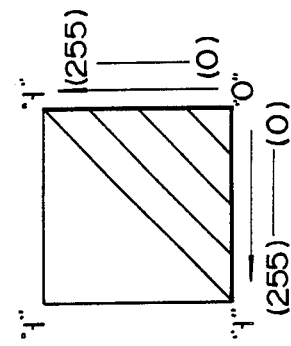
Figure 3B:
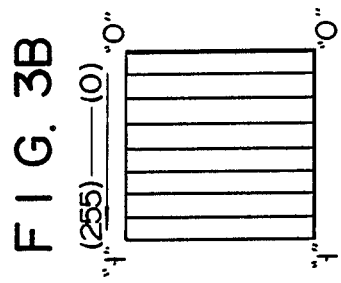
Figure 3E:
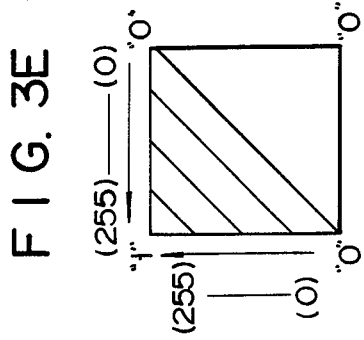
Figure 3A:
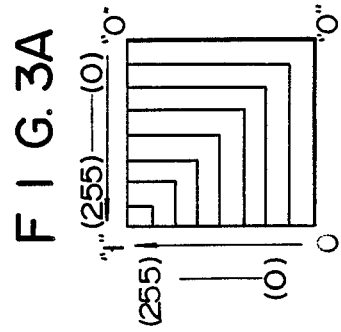
Figure 3D:
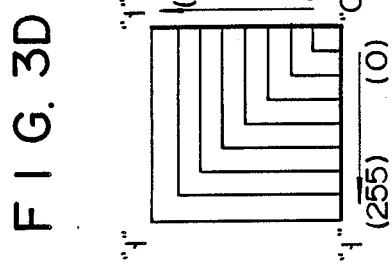
Figure 4:
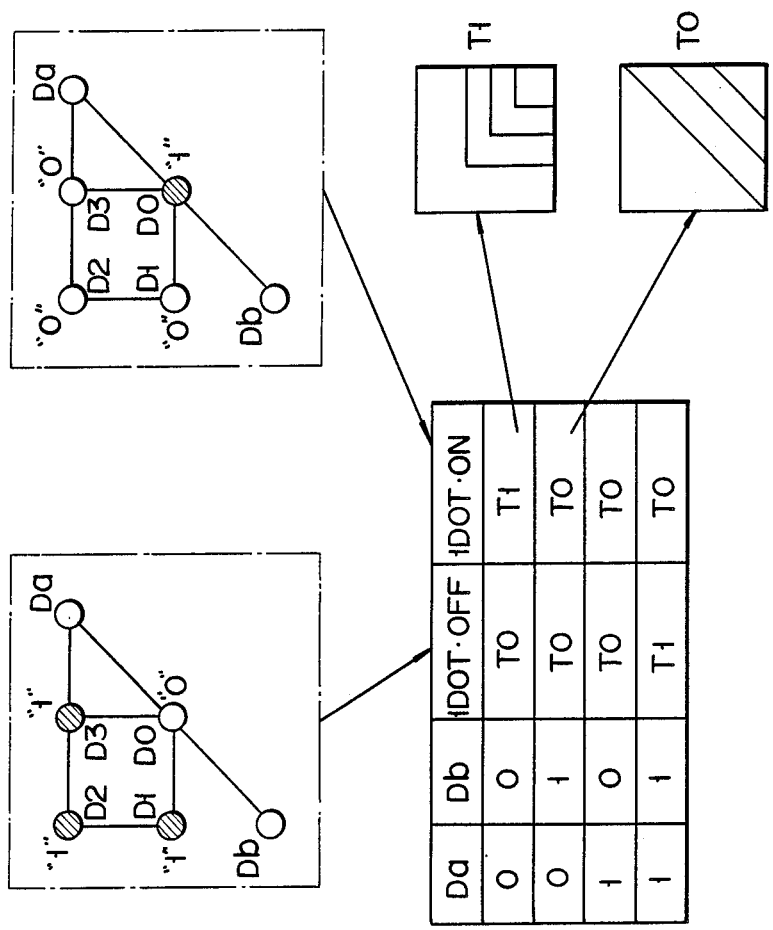
FIG. 4 is a representation for explaining selection of the type of table.

FIG. 4 is a representation for explaining table type selection when one of the four dots of the pattern is set to be on ("1") or off ("0"). The section (DSP) recognizes the on/off states of specific dots (Da, Db) adjacent to the on/off dot, i.e., "0" (D0 given by a hollow circle) when only one of the four dots (D0, D1, D2 and D3) is set to be "0". When the section (DSP) detects that Da,Db="1", a table T1 of a corner type shown in FIG. 3D is selected. However, when at least one of the dots Da and Db is set to be "0" level, a table T0 of an inclination type shown in FIG. 3F is selected. The interpolated value of a new dot located within the four-dot area is determined by the adjacent dot states when the four dots form a specific pattern as described above.

Figures 5A, 5B, 5C, 5D:
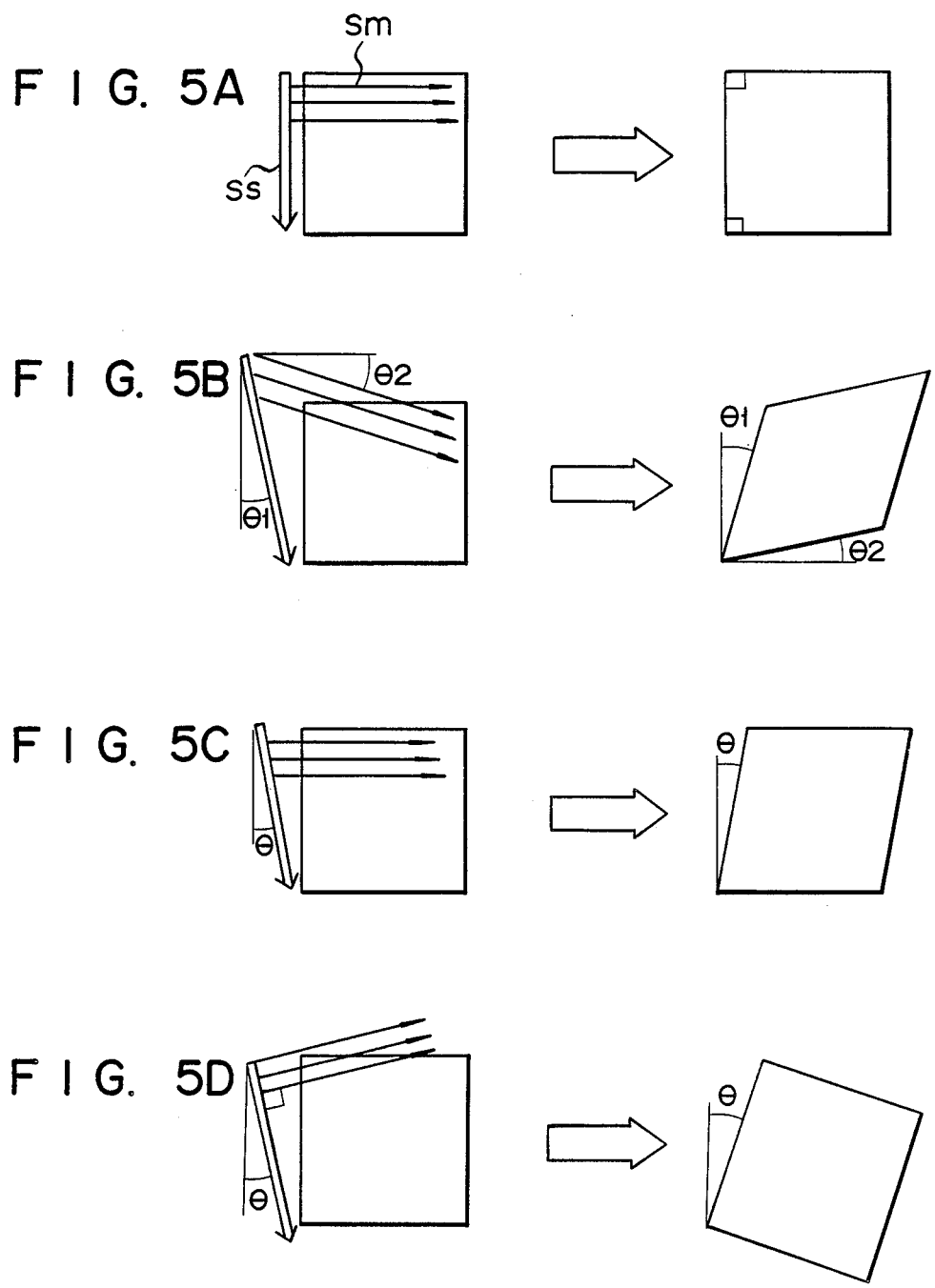
FIGS. 5A through 5D are representations showing examples of pattern conversion, respectively.

FIGS. 5A through 5D respectively show examples of pattern conversion. FIG. 5A shows a non-inclined character (i.e., a contracted character and a standard character), FIG. 5B shows an inclined character, FIG. 5C shows an under-justified inclined character, and FIG. 5D shows a rotated character. It should be noted that reference symbols Sm and Ss denote the main scanning and subscanning directions, respectively.

Figure 6A:
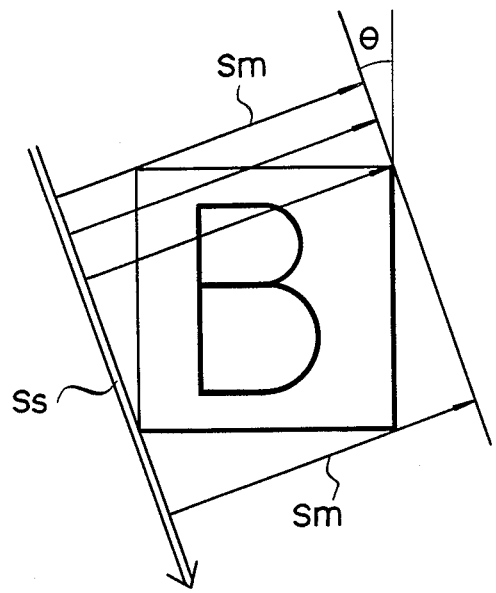
FIGS. 6A and 6B are respectively representations showing a comparision between main scanning and subscanning directions of CRT display and those of printout.
Figure 6B:
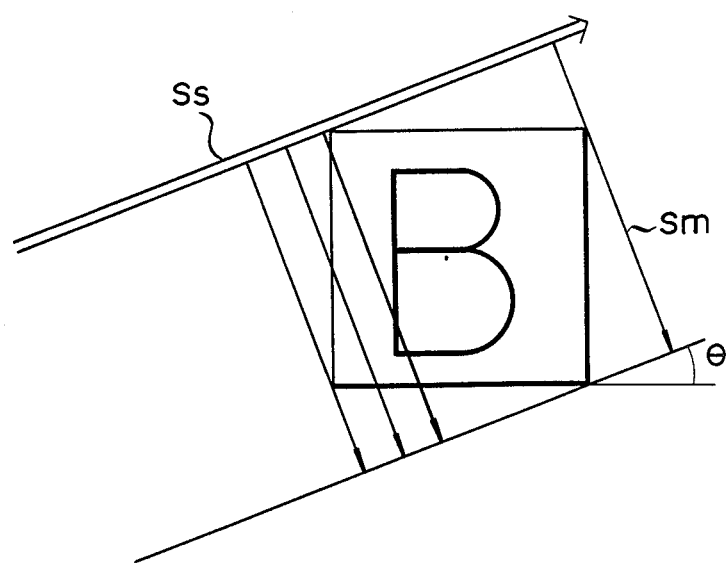

FIGS. 6A and 6B respectively show relationships between an output object (i.e., an image output object) of the dot interpolation and the main scanning and subscanning directions Sm and Ss during interpolation. More particularly, FIG. 6A shows the main scanning and subscanning directions during the CRT display operation when dot interpolation is performed, and FIG. 6B shows the main scanning and subscanning directions during the printout operation when dot interpolation is performed. The main scanning and subscanning directions in the CRT display mode are reversed in the printout mode.

FIG. 7 is a representation showing the relationships among the different input data.

FIG. 8 is a representation showing the relationship between a character is pattern-converted by dot interpolation and a rectangle (including a square) circumscribing the pattern-converted character.

FIG. 9 is a representation showing different character pitches CP and different line pitches LP of the different modified characters.

FIG. 10 is a representation showing cases wherein underlines are expanded for the different modified characters.

FIG. 11 is a representation for explaining the zone designation operation.

The operation of the dot interpolation control system according to this embodiment will be described hereinafter. When dot interpolation input data are externally supplied to the CPU 10 so as to perform dot interpolation, the CPU 10 initializes the various registers. More specifically, the CPU 10 sets a comparison value, i.e., the threshold value th, to be compared with each interpolated value generated from the ROM 58. A dot pitch (dx,dy: an inverse value of the magnification/contraction coefficient,) as a reference of the designated magnification/contraction coefficient, is calculated. The x and y dot pitch components are set in the registers 26 and 27, respectively. In addition, when an original character is to be rotated or inclined, trigonometric function data (sin, cos, tan) corresponding to the designated angle is set in the table 24. Thereafter, the initial values (initial addresses; X1init and Y1init) for producing the dot interpolation addresses and dot pitches (DX1, DY1, DX2, DY2) are calculated in accordance with the contents of the registers 26 and 27 and the trigonometric data (sin, cos, tan) stored in the table 24. The calculated data are stored in the registers 31 to 36. V and H size data (V size, H size) varying in accordance with changes in the character height and width which are caused by pattern conversion such as expansion and rotation are calculated using the contents of the registers 31 to 36.

The resultant data are respectively set in the registers 21 and 22. In addition, when zone division is required, the number of zones is calculated, and the resultant data is stored in the register 25. Furthermore, when the dot-interpolated character is shifted within the range of 1 through 7 dots in the printout mode (e.g., the agate or condensed letters or the like are vertically shifted within the range of 1 through 7 dots), or when the number of dots of the pattern-converted character along the main scanning direction is not a multiple of the write width (i.e., 8 dots) of the image memory and must be matched with the byte boundary (the write width) of the image memory, an offset value falling within the range of 1 through 7 dots is set in the offset register 28.

When initialization of the respective registers is completed, the CPU 10 produces the following dot interpolation addresses.

The overall operation will be described by exemplifying a case wherein a non-inclined letter (or contracted or expanded letter) is defined as an output object and is processed (e.g. simple expansion or contraction). In the dot interpolation mode, data "0" is set in the register 31, the x-component dot pitch dx is set in the register 32, an x-component initial value sx along the main scanning direction Sm is set in the register 33, a y-component dot pitch dy is set in the register 34, data "0" is set in the register 35, and a y-component initial value sy along the subscanning direction Ss is set in the register 36.

The x- and y-component dot pitches dx and dy respectively set in the registers 32 and 34 are given as inverse numbers of the magnification/contraction coefficient. The x-component initial value sx stored in the register 33 is given as $Ix=(dx-1)/2$. The y-component initial value sy stored in the register 36 is given as $Iy=(-dy-1)/2$. When the data dx or dy is less than "1", i.e., when an expanded letter is to be produced, the data Ix or Iy is negative, thus representing addresses excluding the original character pattern memory area of the buffer 52. However, when the data dx or dy is more than "1", i.e., when a contracted letter is to be produced, the data Ix or Iy is positive, thus representing an address within the original character pattern storage memory area of the buffer 52. The comparison value, i.e., the threshold value th of any level (0 through 255 levels) is set in the register 50 and is compared with the interpolated value generated from the ROM 58 so as to determine what levels of new dots are significant.

The CPU 10 further reads out one-character dot pattern data as the dot interpolation object from the memory 51 and writes the readout data in the buffer 52. In this case, the one-character dot pattern data as the dot interpolation object is stored such that the dot pattern of one character is surrounded by "0" dots which are insignificant dots.

When the data are set in the registers 31 through 36 and the character pattern subjected to interpolation is set in the buffer 52, the data sx and sy as initial dot addresses stored in the registers 33 and 36 are respectively stored in the registers 42 and 46 under the control of the control circuit 49. In order to start main scanning, the data sx and sy stored in the registers 42 and 46 are selected by the selectors 43 and 47 and are stored in the registers 44 and 48, respectively.

The integral parts of the data sx and sy stored in the registers 44 and 48 are supplied to the selector 53, and the decimal parts thereof are supplied to the ROM 58.

The four-dot matrix data is selected from the buffer 52 in accordance with the integral parts supplied to the selector 53. The selected data is supplied to the ROM 58. In this case, when character expansion is to be performed, i.e., if condition dx,dy < 1 is established, negative values representing the addresses excluding those of the original character pattern memory area of the buffer 52 are supplied to the selector 53. Therefore, dot selection is started from the four-dot matrix data including the dots which are not included in the original character pattern memory area. However, when the original character is to be contracted, i.e., if condition dx,dy > 1 is established, positive values representing the addresses included in those for the original character pattern storage area of the buffer 52 are supplied to the selector 53. Dot selection is started from the four-dot matrix data in the original character pattern memory area.

The ROM 58 generates the x- and y-components dot interpolation addresses (a total of 10 bits) from the registers 44 and 48, the adjacent four dot data from the selector 53 and the one-bit interpolated value selection signal from the section (DSP). For example, as shown in FIG. 4, when only one dot D0 (represented by the hollow circle in FIG. 4) is kept off, i.e., "0" among the four dots D0, D1, D2 and D3, the adjacent specific dots Da and Db are subjected to on/off detection. The interpolated value selection signal is generated such that if the condition Da,Db = "1" is established, the table T1 of the corner type shown in FIG. 3D is selected, but that when at least one of the dots Da and Db is set to be "0", the table T0 of the inclination type shown in FIG. 3F is selected. When only one dot D0 (represented by the solid circuit in FIG. 4) among the four dots D0, D1, D2 and D3 is kept on, i.e., "1", the on/off states of the adjacent specific dots Da and Db are checked. The interpolated value selection signal is generated such that if condition Da, Db = "0" is established, the table T1 of the corner type shown in FIG. 3A is selected, but that when at least one of the dots Da and Db is "1", the table T0 of the inclination type shown in FIG. 3E is selected. In this manner, when the four dots have a specific pattern, interpolated values of the new dots are determined in accordance with the on/off states of the adjacent specific dots. The 8-bit (0 through 255 levels) interpolated value generated from the ROM 58 is supplied to the comparator 59 and is compared with the comparison value, i.e., the threshold value stored in the register 36. When the interpolated value exceeds the threshold value, the comparator 59 generates a signal of "1" level which represents a significant dot. However, when the interpolated value does not exceed the threshold value, the comparator 59 generates a signal of "0" level which represents an insignificant dot.

After the one-dot interpolated data is read out from the ROM 58, the contents of the registers 44 and 32 are added by the adder 38. The contents of the registers 48 and 35 are added by the adder 40. The sum data from the adders 38 and 40 are selected by the selectors 43 and 47 and are stored respectively in the registers 44 and 48 under the control of the circuit 49. In this case, between the registers 32 and 35 representing the dot pitches along the main scanning direction, the register 32 stores the dot pitch dx derived from the designated magnification/contraction coefficient. The register 35 stores "0" since the noninclined letter (or expanded or contracted letter) is subjected to dot interpolation. Therefore, the content (dot address) of the register 44 is sequentially updated with the dot pitch dx derived from the designated magnification/contraction coefficient every time one dot is interpolated. However, the content of the register 48 is not updated and stores the initial data. Every time one main scanning cycle is completed, the contents of the registers 42 and 31 are added by the adder 37. At the same time the contents of the registers 46 and 34 are added by the adder 39. The sum data from the adders 37 and 39 are selected by the selectors 41 and 45 and are stored respectively in the data selectors 41 and 45 under the control of the circuit 49. In this case, between the registers 31 and 34 representing dot pitch data along the subscanning direction, the register 34 stores the dot pitch by derived from the designated magnification/contraction coefficient. The register 31 stores "0" since the noninclined letter (or the expanded or contracted letter) is subjected to dot interpolation. Therefore, the content (dot address) of the register 46 is updated with the dot pitch dy derived from the designated magnification/contraction coefficient every time one main scanning cycle is completed. However, the content of the register 42 is not updated and stores the initial data.

In this manner, the interpolated values corresponding to the new dot addresses are read out from the ROM 58. The readout interpolated value is compared by the comparator 59 with the threshold value th stored in the register 50, thereby producing the new dot data.

The new interpolated dot data generated from the comparator 59 are sequentially stored in the shift register 60 and sent out onto the CPU bus 12 in units of bytes.

In this case, when the dot-interpolated character pattern data sent onto the bus 12 is to be written in the buffer 18 in the control section 17 and corresponds to one of the cases (I) and (II), the offset data (i "0"s) is generated from the generator 29 in accordance with the offset value (i) of the offset register 28. This offset data is set in the register 60 prior to main scanning. Thereafter, the dot-interpolated data, i.e., the pattern-converted character pattern dots are written.

(I) A case wherein the offset value falling within the range of 1 through 7 dots is set in the register 28 (i.e., the interpolated agate is shifted by i dots (i=1, 2, ... 7) downward in the printout mode), and (II) A case wherein the number of dots of the pattern-converted character along the main scanning direction is not a multiple of the write width (8 dots) of the image memory which is regarded as the output object and must be matched with the byte boundary (the write width) of the image memory, thereby setting the offset value i in the register 28.

The above operation is exemplified wherein the noninclined letter (or the expanded or contracted letter) is the output object. However, in dot interpolation wherein the rotated letter or character is an output object, the predetermined trigonometric function data corresponding to the designated rotation angle is set as one element in each of the registers 31 through 36.

More particularly, if a rotation angle, the number of dots of the original font along the x direction, and the number of dots of the original font along the y direction are respectively defined as $\theta_0$, $a+1$ and $b+1$, the following data are respectively stored in the registers 31, 32, 34 and 35, respectively:

$DX1 = -dx \cdot \sin \theta_0$ $DX2 = dx \cdot \cos \theta_0$ $DY1 = dy \cdot \cos \theta_0$ $DY2 = dy \cdot \sin \theta_0$ The following data are respectively stored in the register 33 (X1init) and the register 36 (Y1init) as follows:

(1) For $0° \leq \theta_0 \leq 90°$ $X1init = (\frac{1}{2})a(\frac{1}{2}) - (a+1-dx)\cos 2\theta_0$ $Y1init = -(\frac{1}{2})(1-dy) - (\frac{1}{2})(a+1-dx)dy/dx \cdot \sin 2\theta_0$ (2) For $90° \leq \theta_0 \leq 180°$ $X1init = a + (\frac{1}{2})(1-dx) - (\frac{1}{2})(b+1-dy)dy/dx \cdot \sin 2\theta_0$ $Y1init = (\frac{1}{2})b + (\frac{1}{2})(b+1-dy)\cos 2\theta_0$ (3) For $180° \leq \theta_0 \leq 270°$ $X1init = (\frac{1}{2})a + (\frac{1}{2})(a+1-dx)\cos 2\theta_0$ $Y1init = b + (\frac{1}{2})(1-dy) + (\frac{1}{2})(a+1-dx)dy/dx \cdot \sin 2\theta_0$ (4) For $270° \leq \theta_0 \leq 360°$ $X1init = (\frac{1}{2})(1-dx) + (\frac{1}{2})(b+1-dy)dx/dy \cdot \sin 2\theta_0$ $Y1init = (\frac{1}{2})b - (\frac{1}{2})(b+1-dy)\cos 2\theta_0$ The values DX1, DX2, DY1, DY2, X1init and Y1init of the dot pitch data including the trigonometric function data corresponding to the rotation angle $\theta_0$ and the initial address data are calculated and are set in the corresponding registers 31 through 36. Dot interpolation address updating along the main scanning and subscanning directions is continuously performed to obtain rotated character pattern dots at the designated rotation angle $\theta_0$.

In the dot interpolation address updating for an inclined character, data including as one element the predetermined trigonometric function data of the table 24 (which represents the designated inclination angle), is stored in specific ones of the registers 31, 32, 34 and 36.

When an inclination angle, the number of dots of the original font along the x direction and the number of dots of the original font along the y direction are defined as $\theta_0$, $a+1$ and $b+1$, respectively, the following data are respectively stored in the registers 31, 32, 34 and 35:

$DX = dx \cdot \tan \theta_0$ $DX2 = dx$ $DY1 = dy$ $DY2 = 0$ for $0° < \theta_0 < 90°$ The following data are respectively set in the registers 33 and 36:

$$X1init = (\tfrac{1}{2})(1-dx) - (b+1-dy)dx/dy \cdot \tan\theta_0$$

$$Y1init = -(\tfrac{1}{2})(1-dy)$$

By using the equations given above, the values DX1, DX2, DY1, DY2, X1init and Y1init of the dot pitch data including the trigonometric function data corresponding to the designated inclination angle $\theta_0$ and of the initial address data are calculated. The calculated values are stored in the corresponding registers 31 through 36. Dot interpolation address updating along the main scanning and subscanning directions is continuously performed to obtain inclined character pattern dots for the designated inclination angle $\theta_0$.

As is apparent from the above description, the values DX1, DX2, DY1, DY2, X1init and Y1init of the dot pitch data including the trigonometric function data corresponding to the designated inclination angle $\theta_0$ and of the initial address data are calculated and dot interpolation address updating along the main scanning and subscanning directions is continuously performed in response to the resultant address data to obtain new dots. The new dot data are stored in the shift register 60 in the same manner as described above and are sent onto the bus 12 in units of bytes (8 bits). The one-byte data are sequentially written in the buffer 18 in the control section 17.

In this case, the buffer 18 has a bit width (e.g., 8 in length×3 in width=24 dots) corresponding to the printing character height. Therefore, the modified character such as the rotated and inclined characters described above excluding the contracted character pattern cannot be fitted within the 24-dot size. In order to divide the new character pattern into a plurality of zones at the time of initialization of the registers, the CPU 10 calculates the number of zones for the designated type face and the character pattern-converted by designating the angle and the magnification/contraction coefficient and sets the zone number data in the register 25. The content of the register 25 is decremented by one every time the pattern is written in units of zones. The respective zone data are processed as those of a single character pattern until the content of the register 25 is zero. For the zones designated by the register 25, continuous bit printing can be performed without inserting a blank area (i.e., the line pitch). A zone division method is illustrated in FIG. 11.

The zone number calculating means calculates a size of a rectangle (including a square) of the x and y directions which circumscribes the character converted (modified) by the designated rotation angle/inclination angle/magnification or contraction coefficient, and also calculates the number of dots (x and y dot numbers) along the two sides circumscribed about the character. The calculated x and y dot number data are set as the V and H size data in the registers 21 and 22 at the initialization of the registers, thereby allowing the zone number to be easily identified. In other words, for the character converted at a given angle, the character writing (processing) is performed on the basis of the rectangular area which is defined by the horizontal and vertical lines and which circumscribes the character. For example, in the dot interpolation for printout operation, the H size data stored in the register 22 is divided by the bit width "24" of the buffer 18 to allow the number of zones to be easily calculated. In the dot interpolation for CRT display output, the V size data is divided by the bit width "24" of one display line to allow the number of zones to be easily calculated.

By storing the zone designation data in the register 25, the identical zone image data can be repeatedly expanded. The character pattern modified by dot interpolation can be partially or entirely printed out or displayed as a redundant modified character pattern.

The V and H size data described above can also be referred to in under/side line processing so as to set the character pitch. More particularly, in the inclined or rotated character obtained by dot interpolation upon designation of any inclination angle along the scanning direction, its height and width can vary in accordance with the inclination angle and the magnification/contraction coefficient. When the modified character is generated on the basis of row and column directions (x and y directions), the character pitch and the under/side line or the like cannot be determined by a designated means using a fixed parameter.

In order to solve the above problem, a rectangle circumscribing a character is used as a body face for the processing of the character pitch and the under/side line. The processing procedure will be described hereinafter.

Character pitch processing will be first described. Every time the one-character dot image processed by dot interpolation is regarded as the output object, e.g., every time the one-character dot image is expanded (written) in the buffer 18 in the control section 17, the CPU 10 determines whether or not the content (V size) of the register 21 is updated. If the CPU 10 determines that the content of the register 21 is not updated, data obtained by adding ½ to the data stored therein is supplied as control data representing the character pitch to the control section 17, thereby controlling the pitch of the character data expanded in the buffer 18. However, when the CPU 10 determines that the content of the register 21 is updated, the data prior to updating is held in the specific register area. When data is to be updated, ½ of a sum of the data prior to data updating and the updated data is added to the updated data stored in the register 21. The resultant data is supplied as control data representing the character pitch to the control section 17, thereby controlling the pitch of the character data expanded in the buffer 18.

The character converted at a given angle is written (processed) on the basis of the rectangular area defined by the horizontal and vertical lines circumscribing the character. The pitch of the adjacent two characters is therefore determined in accordance with the length (the V size for the printout mode, and the H size for the CRT display mode) of the side of the rectangle. The same pitch control as described above can be applied to the line pitch determination. The character pitches CP and the line pitches LP for the different modified characters are illustrated in FIG. 9.

Although the above-mentioned pitch control is performed by considering the area (the circumscribing rectangle) of the adjacent character, the pitch may be determined by the current value of the register 21 (or the register 22) in order to simplify processing.

The operation will be described wherein an under/side line is generated on the basis of the circumscribing rectangle described above. In the printout mode, the data (the V size data) stored in the register 21 is referred to. In the CRT display mode, the data (the H size data) stored in the register 22 is referred to. A case will be exemplified wherein the under/side line is processed in the printout mode. The controller 23 in the control section 17 expands the underline or side line dots in the buffer 18 in accordance with the under/side line instruction included in the print control data supplied through the bus 12. However, the line expansion cannot be properly performed for the modified characters such as the rotated or inclined character on the basis of the normal character width. In order to solve the problem, the content (the V size data) of the register 21 is continuously received by the controller 23. When the under/side line instruction is generated, the under/side line dot pattern is generated at a line length corresponding to the current content (i.e., the updated data) of the register 21, and the pattern is expanded for the corresponding modified character in the buffer 18. Examples of underline expansion for the different modified characters are respectively illustrated in FIGS. 10A through 10C.

What is claimed is:

1. A dot interpolation control system for dot-interpolating a character pattern comprising:
    first operating means for calculating initial values and dot pitches along main and subscanning directions in accordance with x and y component data and angle component data;
    first storage means for storing an initial value along said main scanning direction, calculated by said first operating means;
    second storage means for storing an initial value along said sub scanning direction, calculated by said first operating means;
    third storage means for storing a dot pitch along said main scanning direction calculated by said first operating means;
    fourth storage means for storing a dot pitch along said sub scanning direction calculated by said first operating means;
    fifth storage means for storing dot position data along said main scanning direction;
    sixth storage means for storing dot position data along said sub scanning direction;
    second operating means for: (1) initially loading the data stored in said first storage means and said second storage means into said fifth storage means, (2) calculating dot positions along said main scanning direction in accordance with the contents of said third and fifth storage means, and (3) storing the calculated dot positions in said fifth storage means; and
    third operating means for: (1) initially loading the data stored in said first and second storage means into said sixth storage means, (2) calculating the dot positions along the sub scanning direction in accordance with the contents of said fourth and sixth storage means, and (3) storing the calculated dot positions along the sub scanning direction in said sixth storage means, so that said sixth storage means includes sub scanning direction data.

2. A system according to claim 1, wherein said second operating means comprises:
    adding means for adding said dot pitches along said main scanning direction stored in said third storage means, to said dot position data along said main scanning direction stored in said fifth storage means;
    selector means, connected to said adding means and said sixth storage means, for selectively outputting one of said dot position data along the sub scanning direction stored in said sixth storage means, and an output of said adding means, at the start of main scanning; and
    selection control means, connected to said selector means, for supplying a selection signal to said selector means to cause said selector means to select said dot position data along said sub scanning direction stored in said sixth storage means at the start of main scanning, and to thereafter select said output of said adding means each time a one dot interpolation processing is performed.

3. A system according to claim 1, further comprising:
    threshold value register means for storing a threshold value;
    seventh storage means for storing dot data of a four-dot matrix;
    dot determination control means for recognizing a fourdot pattern state in accordance with dot data stored in said seventh means, and for sequentially selecting two dot matrix data whose pattern surrounds the four-dot pattern state, when the state is detected to be a specific status;
    dot determination means for outputting an interpolated value selection signal in accordance with said two-dot matrix data, and said dot data stored in said seventh storage means;
    interpolation table means, connected to said fifth storage means and said seventh storage means, for receiving the dot position data stored in said seventh storage means, said matrix data stored in said seventh storage data means, and said interpolated value selection signal from said dot determination means, and for producing a new dot interpolated value within an area surrounded by said four dot matrix;
    comparator means, connected to said threshold value register means and said interpolation table means, for comparing the interpolated value output from said interpolation table means with the threshold value stored in said threshold value register means, and for producing an on-dot signal when said interpolation value is greater than said threshold value;
    offset register means for storing an offset value to be selectively applied to pattern converted data;
    offset data generating means, connected to said offset register means, for generating an offset data of dots designated by said offset value stored in said offset register means; and
    register means for storing said offset data from said offset data generating means and said dot data from said comparator means.

4. A system according to claim 3, further comprising:
    character pattern memory means for storing character pattern data in a predetermined dot matrix;
    one character buffer means for storing said one character dot pattern surrounded by a bit pattern of off dots; and
    dot selecting means for selectively outputting data of a four-dot matrix to said seventh storage means, said four-dot matrix for surrounding the new dots from the character pattern data stored in said one-character buffer means in accordance with the dot position data stored in said fifth storage means.

5. A system according to claim 4, wherein the dot position data stored in said fifth storage means comprises an integral part data and a decimal part data, and said dot selecting means selects the dot data of a four-dot matrix for surrounding new dots in accordance with said integral part data of said dot position data.

6. A system according to claim 3, further comprising:
width register means for storing a size data corresponding to a width along the sub scanning direction which is obtained after a character pattern is converted; and
under/side line dot pattern generating means for generating an under/side line dot pattern in accordance with said size data stored in said width register means.

7. A system according to claim 3, further comprising:
width register means for storing a size data corresponding to a width along the sub scanning direction which is obtained after a character pattern is converted; and
means for producing a control data indicating a character pitch by adding a value to 1/n, where n is a positive integer indicative of the size data, to the size data.

8. A system according to claim 7, further comprising:
second width register means for storing a second size data corresonding to a width along the main scanning direction which is obtained after a character pattern is converted; and
means for producing a control data indicating a line pitch by adding a value of 1/m, where m is a positive integer indicative of the second size data, to the second size data.

9. A system according to claim 1, wherein said first operating means includes number-of-zones calculating means for calculating a number of zones by dividing a height of a dot-interpolated character pattern by a reference height, when said height of the dot-interpolated character exceeds a reference height;
and further comprising number-of-zones register means for storing the calculated number of zones from said number-of-zones calculating means;
an output buffer; and
means for continuously writing the zones of the character pattern into an output buffer by the number of times designated by the number of zones stored in said number-of-zones register, without causing a blanking area.

10. A system according to claim 1, wherein said output buffer includes a display unit and has a display buffer connected to said display unit.

11. A system according to claim 9, wherein said output buffer includes a printer and has a line buffer connected to said printer.

12. A system according to claim 9, wherein said number-of-zones calculating means calculates the number of zones of the dot-interpolated character in accordance with a designated conversion font of at least one magnification/contraction coefficient and sets the calculated number of zones in said number-of-zones register means.

13. A system according to claim 12, wherein said number of zones in said number-of-zones register means is decremented by one every time zone pattern data is written, and respective zone pattern data are processed as those of a single character pattern until the content of said number-of-zones register means is zero.

14. A system according to claim 1, further comprising:
a trigonometric function table for storing trigonometric function data corresponding to said any designated angle, for inclination or rotation of the character pattern;
and wherein said first operating means calculates initial values and dot pitches along the main scanning and sub scanning directions with reference to said trigonometric function table.

* * * * *